United States Patent
Abrishamkar

[19]

[11] Patent Number: 6,097,716
[45] Date of Patent: Aug. 1, 2000

[54] RATE DETECTION FOR MULTI-RATE COMMUNICATIONS

[75] Inventor: Farrokh Abrishamkar, Middletown, N.J.

[73] Assignee: Lucent Technologies Inc., Murray Hill, N.J.

[21] Appl. No.: 08/989,782

[22] Filed: Dec. 12, 1997

[51] Int. Cl.[7] ....................................... H04Q 7/28
[52] U.S. Cl. ........................... 370/342; 375/225; 375/341
[58] Field of Search .................................... 370/328, 329, 370/335, 342; 375/224, 225, 260, 261, 262, 340, 341

[56] References Cited

U.S. PATENT DOCUMENTS

| | | |
|---|---|---|
| 4,761,800 | 8/1988 | Lese et al. . |
| 5,481,751 | 1/1996 | Alpert et al. .............................. 712/213 |
| 5,844,947 | 12/1998 | Cesari ....................................... 375/341 |
| 5,883,923 | 3/1999 | Shimazaki ................................ 375/225 |

OTHER PUBLICATIONS

Multi–Rate Detection For The IS–95A CDMA Forward Traffic Channels Using The 13KBPS Speech Coder, by Edith Cohen and Hui–Ling Lou, AT&T Laboratories, Nov. 1995, 5 pages.

*Primary Examiner*—Ajit Patel
*Assistant Examiner*—Bob A. Phunicolh
*Attorney, Agent, or Firm*—Steve Mendelsohn

[57] ABSTRACT

For a given rate set, an IS-95 transmitter can generate an IS-95 signal at any one of four different data rates. According to the present invention, an IS-95 receiver performs a statistical analysis on the received data stream to determine which particular data rate was used by the transmitter. In particular, the IS-95 receiver uses partially decoded data from the received signal to generate a statistical value corresponding to the log likelihood function for each of the four possible data rates and selects the data rate having the largest corresponding statistical value as the data rate used by the transmitter to generate the signal. The receiver then uses this detected data rate to complete the process of decoding and reconstructing the data from the received signal.

24 Claims, 2 Drawing Sheets

RATE DETECTION FOR MULTI-RATE COMMUNICATIONS

BACKGROUND OF THE INVENTION

Field of the Invention

The present invention relates to digital communications, and, in particular, to CDMA-based cellular telephone communications.

Description of the Related Art

The IS-95 code division multiple access (CDMA) digital cellular standard supports two different sets of data rates. Rate Set 1 is based on a maximum symbol rate of 19,200 symbols per second (sps), and Rate Set 2 is based on a maximum symbol rate of 28,800 sps. Each rate set has four different data rates—a full rate and three sub-rates. For Rate Set 1, the full rate is 9.6 kbps and the three sub-rates are 4.8 kbps, 2.4 kbps, and 1.2 kbps. Similarly, for Rate Set 2, the full rate is 14.4 kbps and the three sub-rates are 7.2 kbps, 3.6 kbps, and 1.8 kbps. According to the IS-95 standard, block interleaving is applied to a symbol stream having a symbol rate of 19,200 sps. Thus, depending on the particular rate set and selected data rate, the data are manipulated in different ways to achieve the required 19,200-sps modulation symbol rate.

FIG. 1 shows a block diagram of the data processing implemented by a conventional IS-95 transmitter 100. IS-95 transmitters (and receivers) are typically designed to operate with only one of the two allowed IS-95 rate sets. Transmitter 100 of FIG. 1 is designed for Rate Set 2. The processing of FIG. 1 takes a data stream generated by a speech coder and converts that data stream into a modulated CDMA signal that can be transmitted to one or more remote IS-95 receivers.

In particular, convolutional encoding 102 converts the received data stream into a stream of code symbols. The code symbols in this stream are then repeated (104) as necessary to achieve the maximum symbol rate for the rate set of the particular transmitter (in this case, Rate Set 2).

For example, for the 14.4-kbps full data rate of Rate Set 2, convolutional encoding 102 generates code symbols at a rate of 28,800 sps. Since this symbol rate is equal to the maximum symbol rate for Rate Set 2, for the full data rate, the code symbols generated by convolutional encoding 102 are not repeated. However, for the 7.2-kbps sub-rate of Rate Set 2, convolutional encoding 102 generates code symbols at a rate of 14,400 sps. In this case, each code symbol in the stream is repeated one time (i.e., each code symbol appears twice) to achieve the maximum symbol rate of 28,800 sps for Rate Set 2. Similarly, for the 3.6-kbps sub-rate of Rate Set 2, each code symbol in the stream generated by convolutional encoding 102 is repeated three times (i.e., each code symbol appears four times) to achieve the maximum symbol rate of 28,800 sps for Rate Set 2; and, for the 1.8-kbps sub-rate of Rate Set 2, each code symbol in the stream generated by convolutional encoding 102 is repeated seven times (i.e., each code symbol appears eight times) to achieve the maximum symbol rate of 28,800 sps for Rate Set 2.

Analogously, for a different IS-95 transmitter designed for Rate Set 1, for the 9.6-kbps full data rate of Rate Set 1, convolutional encoding 102 generates code symbols at a rate of 19,200 sps. Since this symbol rate is equal to the maximum symbol rate for Rate Set 1, the code symbols are not repeated. However, for the 4.8-kbps sub-rate of Rate Set 1, convolutional encoding 102 generates code symbols at a rate of 9,600 sps. In this case, each code symbol in the stream is repeated one time (i.e., each code symbol appears twice) to achieve the maximum symbol rate of 19,200 sps for Rate Set 1. Similarly, for the 2.4-kbps sub-rate of Rate Set 1, each code symbol in the stream generated by convolutional encoding 102 is repeated three times (i.e., each code symbol appears four times) to achieve the maximum symbol rate of 19,200 sps for Rate Set 1; and, for the 1.2-kbps sub-rate of Rate Set 1, each code symbol in the stream generated by convolutional encoding 102 is repeated seven times (i.e., each code symbol appears eight times) to achieve the maximum symbol rate of 19,200 sps for Rate Set 1.

Puncture 106 of FIG. 1, which is performed only in IS-95 transmitters designed for Rate Set 2, refers to the process of dropping two—and retaining four—out of every six code symbols to reduce the symbol rate from 28,800 sps, as generated by symbol repetition 104 for Rate Set 2, to the required 19,200-sps modulation symbol rate for IS-95 signals. Thus, no matter what rate set the transmitter is designed for and no matter what data rate is selected, the stream of code symbols entering block interleaving 108 has a symbol rate of 19,200 sps. Block interleaving 108, power bit insertion 110, and CDMA modulation 112 convert the resulting 19,200-sps symbol stream into modulated CDMA signals that can be further modulated and transmitted to remote IS-95 receivers.

Table I tabulates the occurrence rates (i.e., how many times each code symbol appears) and puncture rates for the different IS-95 rate sets and data rates.

TABLE I

| Rate Set | Data Rate | Data Rate (kpbs) | Occurrence Rate | Puncture Rate |
|---|---|---|---|---|
| Rate Set-1 | Full Rate | 9.6 kbps | 1 | N/A |
| | Sub-rate 1 | 4.8 kbps | 2 | N/A |
| | Sub-rate 2 | 2.4 kbps | 4 | N/A |
| | Sub-rate 3 | 1.2 kbps | 8 | N/A |
| Rate Set-2 | Full Rate | 14.4 kbps | 1 | Drop 2 of 6 |
| | Sub-rate 1 | 7.2 kbps | 2 | Drop 2 of 6 |
| | Sub-rate 2 | 3.6 kbps | 4 | Drop 2 of 6 |
| | Sub-rate 3 | 1.8 kbps | 8 | Drop 2 of 6 |

As mentioned earlier, typical IS-95 transmitters and receivers are designed to operate in only one of the two allowed IS-95 rate sets (i.e., either Rate Set 1 or Rate Set 2, but not both). Nevertheless, such transmitters and receivers must support any of the four different data rates for that particular rate set. Both the convolutional encoding 102 and symbol repetition 104 of an IS-95 transmitter, such as transmitter 100 of FIG. 1, require knowledge of the selected data rate in order to function properly. For example, with knowledge of the selected data rate, symbol repetition 104 knows how many times to repeat each received code symbol to achieve the maximum symbol rate. An IS-95 receiver, on the other hand, has no independent, a priori knowledge of which data rate was used by the IS-95 transmitter that generated a particular received IS-95 signal. Without such knowledge, the IS-95 receiver will not know how to undo the symbol repetition that was performed by the IS-95 transmitter and, as a result, the convolutional (or Viterbi) decoder of the IS-95 receiver will not operate properly.

A number of schemes have been used or proposed for determining at the receiver which data rate was used by the transmitter to generate an IS-95 signal. One method is to operate the decoder sequentially at each of the four possible data rates until the selected data rate is correctly identified. In this approach, a combined parallel re-encoding and correlation computation is used to ascertain the rate. The correlation metrics between re-encoded data and the Viterbi input are computed for the four different rates. The highest correlation metric combined with satisfactory CRC results (if available) provides the correct rate.

Another technique for detecting the selected data rate is described in E. Cohen & H. Lou, "Multi-Rate Detection for IS-95 CDMA Forward Traffic Channels," IEEE GLOBECOM '95, Nov. 1995.

SUMMARY OF THE INVENTION

The present invention is directed to a novel technique for detecting the data rate used to generate an IS-95 signal. For a given rate set, an IS-95 transmitter can generate an IS-95 signal at any one of four different data rates. According to the present invention, an IS-95 receiver performs a statistical analysis on the received data stream to determine which particular data rate was used by the transmitter. In particular, the IS-95 receiver uses partially decoded data from the received signal to generate a statistical value corresponding to the log likelihood function for each of the four possible data rates and selects the data rate having the largest corresponding statistical value as the data rate used by the transmitter to generate the signal. The receiver then uses this detected data rate to complete the process of decoding and reconstructing the data from the received signal.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
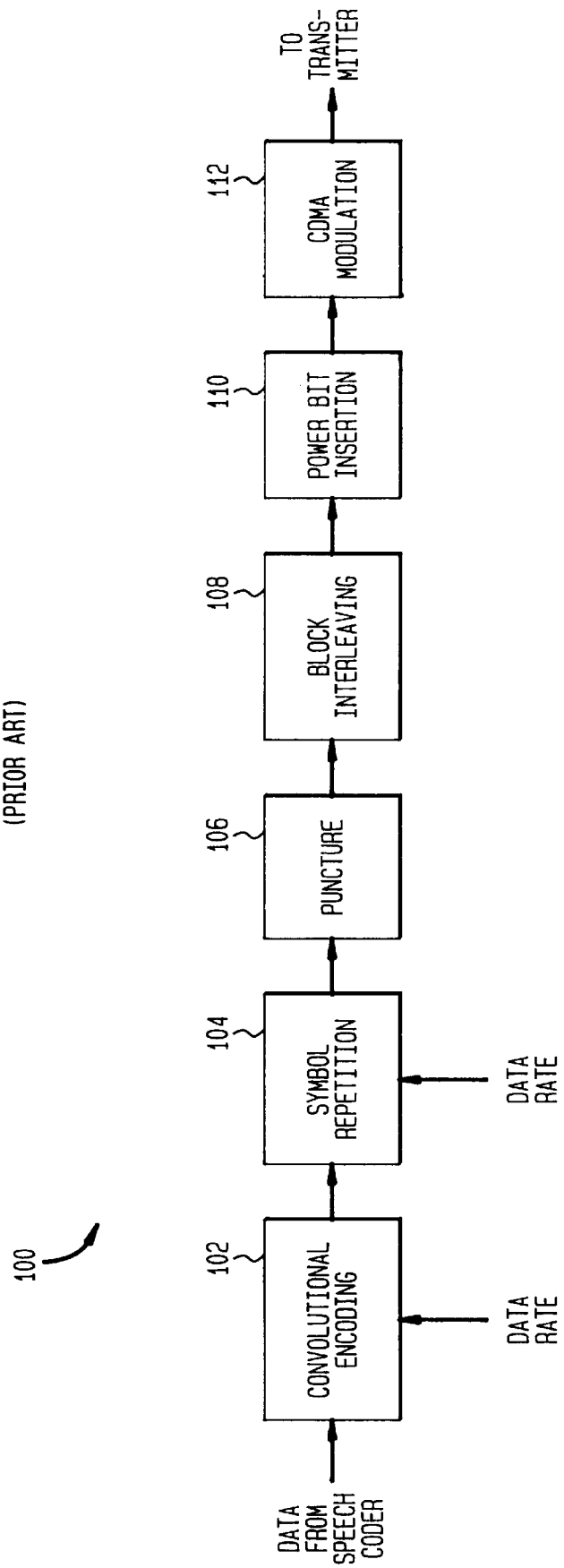
FIG. 1 shows a block diagram of the data processing implemented by a conventional IS-95 transmitter.

The present invention is directed to a statistical approach for detecting the data rate used to generate an IS-95 signal. The invention is based on creating an ensemble of all possible signal patterns. This ensembles will lead to four possible sub-ensembles of signal patterns. After doing so, a mathematical model of the received signal at the output of symbol demodulation is constructed, based on which classical detection algorithms are applied. Symbol de-repetition undoes the processing of the symbol repetition of an IS-95 transmitter. This construction leads to multiple hypothesis testing (quaternary) within which a maximum likelihood metric is used. Log-likelihood functions are created for each hypothesis. Algebraic manipulation of each log-likelihood function leads to a closed-form solution to the likelihood function for each rate. These likelihood functions are conditional for a particular channel state (fade envelope). Assuming that the fade envelope is within less than a couple of hundred Hz, the envelope is maintained constant within one frame time, and likelihoods are compared on a level playing field with each other. The likelihood with the maximum value indicates the selected data rate.

The essence of the algorithm is the modeling of the transmitter signal within the context of statistical detection and applying maximum likelihood algorithm to it, manipulating the mathematics, arriving at closed-form solutions, and, for implementation, approximating the closed-form solutions to further simplified forms.

The algorithm assumes that the transmission is done at one of four different data rates, i.e., the full rate and three sub-rates, where each successive rate is half the previous rate (as in Table I). At each successive rate, the power is also cut in half (i.e., reduced by 3 dB). Furthermore, it is assumed that the signal amplitude is not a random variable (i.e., the base station is not randomly loading the power of the pilot). This may not be a realistic assumption, although once the assumption is removed, the algorithm can be generalized, where the randomness of the transmitted signal and the channel effects can also be included. In other words, in its most general form, the received signal at the output of symbol demodulation has a signal component and a noise component. The signal component is multiplied by the envelope of the fade of the pilot channel and a random variable representing the randomness of the transmitter loading and everything else in the channel. Therefore, the signal component of the received signal will have two randomnesses associated with it: (1) its power and (2) the channel state associated with it. In this case, assuming that the doppler effect is still less than 200 Hz, the channel loading effect can be clubbed into the rate parameter to form a new vector unknown parameter consisting of the cascaded channel effect and the unknown rate. For this particular model, composite hypothesis testing is applied and new metrics would be derived, and the algorithm would be based on maximum likelihood testing.

Figure 2:
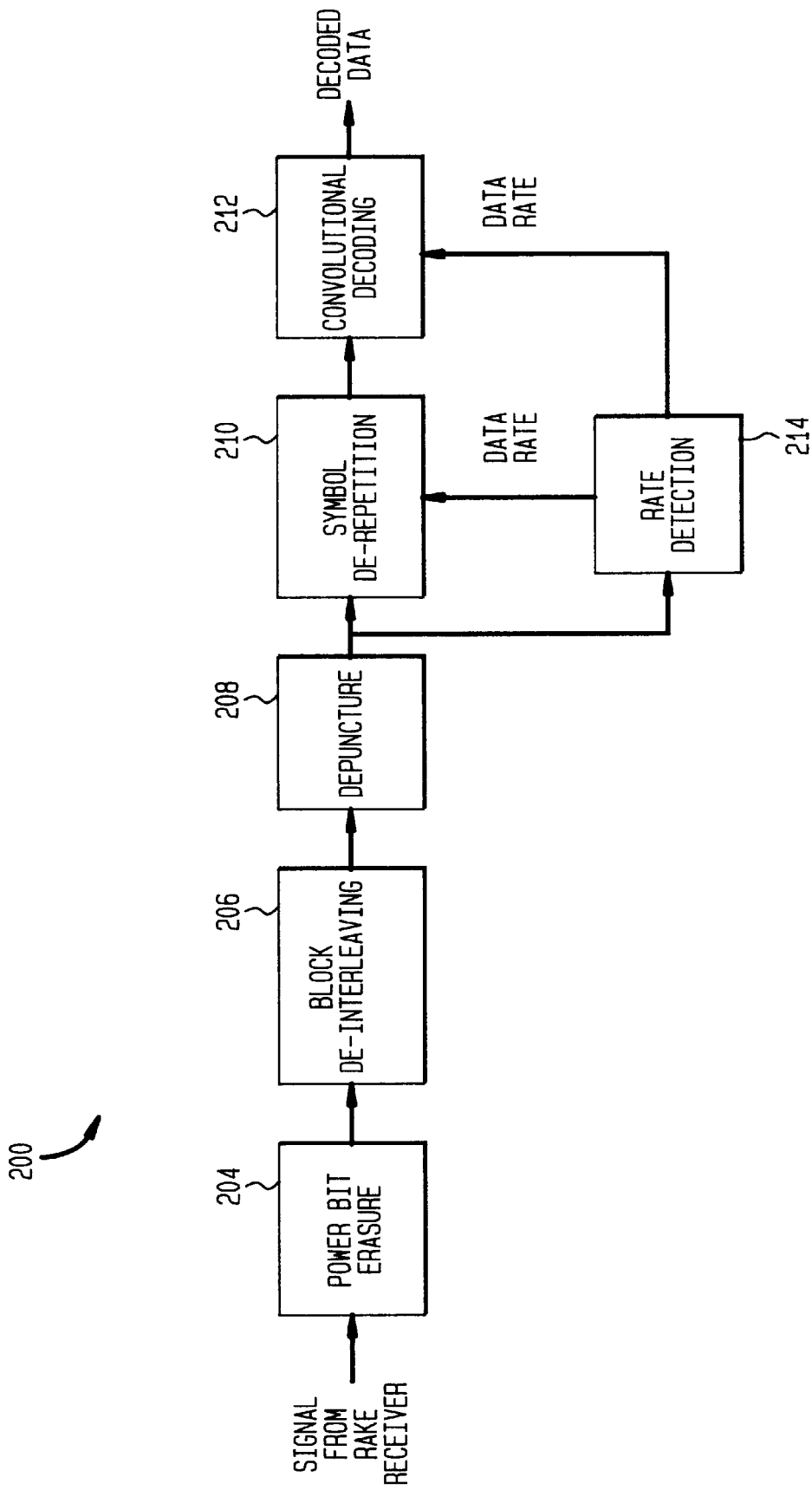
FIG. 2 shows a block diagram of the data processing implemented by an IS-95 receiver, according to one embodiment of the present invention.

FIG. 2 shows a block diagram of the data processing implemented by an IS-95 receiver 200, according to one embodiment of the present invention. IS-95 receivers of the present invention may be designed to operate with only one of the two allowed IS-95 rate sets. Receiver 200 of FIG. 2 is designed for Rate Set 2. The processing of FIG. 2 takes a signal received from an IS-95 transmitter, e.g., by the rake receiver (not shown) of receiver 200 and converts that received signal into a decoded data stream.

Power bit erasure 204 and block de-interleaving 206 are applied to undo the corresponding transmitter processing of power bit insertion 110 and block interleaving 108 of FIG. 1, respectively, to recover the symbol stream. This recovered symbol stream has a symbol rate of 19,200 sps for either Rate Set 1 or Rate Set 2. For receivers like receiver 200 of FIG. 2 designed for Rate Set 2, depuncture 208 is applied to undo the processing of puncture 106 of FIG. 1 in order to recover the symbol stream having the maximum symbol rate of 28,800 sps for Rate Set 2. For IS-95 receivers designed for Rate Set 1, the recovered symbol stream generated by block de-interleaving 206 has a symbol rate of 19,200 sps and no depuncture processing is required.

In any case, at this juncture, if the selected data rate were known, all that would need to be done to generate the decoded data stream would be to apply symbol de-repetition to the recovered symbol stream to undo the symbol repetition 104 of FIG. 1 and then apply convolutional decoding to undo the convolutional encoding 102 of FIG. 1. However, as mentioned earlier, an IS-95 receiver has no independent, a priori knowledge of which data rate was used by the IS-95 transmitter that generated the symbol stream being decoded.

Therefore, according to the present invention, rate detection 214 is applied to the recovered symbol stream generated by depuncture 208 (or by block de-interleaving 206 for Rate Set 1) to determine which of the four possible data rates for the particular rate set was used by the IS-95 transmitter. The detected data rate is then used to perform both symbol de-repetition 210 and convolutional decoding 212 to generate the decoded data stream. The processing implemented during rate detection 214 is based on the following analysis.

Signal and Channel

The transmitted traffic signal complex envelope $\tilde{T}(t)$ can be represented by Equation (1) as follows:

$$\tilde{T}(t) = x(t)W(t)\tilde{c}(t)e^{j\phi(t)} \qquad (1)$$

where $x(t)$ is the bi-phase shift key (BPSK) data, $W(t)$ are the Walsh codes, $\tilde{c}(t)$ are the quadrature pseudo-noise (PN) codes, and $\phi(t)$ is the initial carrier phase. The BPSK data $x(t)$ can take one of four different levels depending on the selected data rate.

Similarly, the transmitted pilot signal complex envelope $\tilde{P}(t)$ can be represented by Equation (2) as follows:

$$\tilde{P}(t) = aW_0(t)\tilde{c}(t)e^{j\phi(t)} \qquad (2)$$

where $a$ is a voltage scaling factor for the transmitter and $W_0(t)$ is the $0^{th}$ Walsh code (i.e., all 1's), which is reserved for the pilot channel.

The signal $\tilde{R}(t)$ received by an IS-95 receiver (i.e., the single-path fading channel output) can be represented by Equation (3) as follows:

$$\tilde{R}(t) = \tilde{T}(t) + \tilde{P}(t)\rho(t)e^{j\psi(t)} + \tilde{n}(t) \qquad (3)$$

where $\rho(t)$ is the Rayleigh/Rice envelope, $\psi(t)$ is the fading phase, and $\tilde{n}(t)$ is the complex additive white Gaussian noise (AWGN). In Equation (3), the term $\rho(t)e^{j\psi(t)}$ corresponds to the multiplicative noise caused by fading. The variance of the complex AWGN $\tilde{n}(t)$ could be adjusted to represent other-cell noise for interference-limited systems.

Receiver Processing

The initial stages of receiver processing are filtering and sampling. After matched filtering and sampling (perfect timing) and based on Equations (1) and (2), the resultant digital stream $\tilde{R}_1(t)$ can be represented by Equation (4) as follows:

$$\tilde{R}_1(i) = aW_0(i)\tilde{c}(i) + x(i)W(i)\tilde{c}(i)e^{j\phi(i)}\rho(i)e^{j\psi(i)} + \text{noise} \qquad (4)$$

where the term $W_0(i)\tilde{c}(i)$ corresponds to the pilot channel, the term $x(i)W(i)\tilde{c}(i)$ corresponds to the traffic channels, the term $e^{j\phi(i)}$ corresponds to the sampled initial carrier phase, and the term $\rho(t)e^{j\psi(t)}$ corresponds to the sampled fade.

The digital stream $\tilde{R}_2(t)$ that is then generated by undoing the PN codes (i.e., chip de-spreading) can be represented by Equation (5) as follows:

$$\tilde{R}_2(i) = \tilde{R}_1(i)*\tilde{c}^*(i) = aW_0(i) + x(i)W(i)e^{j\phi(i)}\rho(i)e^{j\psi(i)} + \text{noise} \qquad (5)$$

After undoing the pilot and traffic Walsh codes, the received pilot data stream $\tilde{P}(i)$ can be represented by Equation (6) as follows:

$$\tilde{P}(i) = a\rho(i)e^{j\phi(i)+j\psi(i)} + \text{pilot noise} \qquad (6)$$

and the received traffic data stream $\tilde{T}(i)$ can be represented by Equation (7) as follows:

$$\tilde{T}(i) = \rho(i)x(i)e^{j\phi(i)+j\psi(i)} + \text{traffic noise} \qquad (7)$$

The pilot can be estimated ($\hat{P}_i$) from the received pilot channel of Equation (6) and represented by Equation (8) as follows, where hats ($\hat{\ }$) indicate estimation:

$$\hat{P}_i = \hat{\rho}_i e^{j\hat{\phi}_i + j\hat{\psi}_i} \qquad (8)$$

where $\hat{\rho}_i$ is the estimated Rayleigh/Rice envelope derived from channel state information (CSI), $\hat{\phi}_i$ is the estimated initial carrier phase, and $\hat{\psi}_i$ is the estimated fading phase.

Pilot-assisted de-spreading and coherent detection (i.e., mixing the estimated pilot $\hat{P}_i$ of Equation (8) with the traffic data stream $\tilde{T}(i)$ of Equation (7)) yields a recovered data stream $y_i$, which can be represented by Equation (9) as follows:

$$y_i = \tilde{T}(i) \cdot \hat{P}^*(i) = \hat{\rho}_i \rho_i \tilde{x}_i e^{j(\phi_i - \hat{\phi}_i) + j(\psi_i - \hat{\psi}_i)} + \hat{\rho}_i^*(\text{noise}) \qquad (9)$$

Assuming that the pilot signal is several dB above the traffic signal and after de-formatting, the channel data stream input to rate detection 214 can be represented by Equation (10) as follows:

$$y_i = \rho_i^2 \tilde{x}_i + \rho_i^* (\text{noise}) \qquad (10)$$

Signal Ensemble Construction

As described previously, according to the IS-95 standard, for a given rate set, there are four different possible data rates—a full data rate and three sub-rates. For the full data rate, each symbol occurs once (i.e., without any repetition); for the first sub-rate, each symbol occurs twice (i.e., repeated once); for the second sub-rate, each symbol occurs four times (i.e., repeated three times); and, for the third and lowest sub-rate, each symbol occurs eight times (i.e., repeated seven times).

As also described previously, at each successive rate, the power of the signal is cut in half (i.e., reduced by 3 dB). That is, if the power of the full rate is $A_1*A_1$, where $A_1$ is the amplitude of the signal, then the power of the first sub-rate is $$\frac{A_1 * A_1}{2},$$

the power of the second sub-rate is $$\frac{A_1 * A_1}{4},$$

the power of the third sub-rate is $$\frac{A_1 * A_1}{8}.$$

Moreover, the relationships of Equations (11)–(13) apply as follows:

$$A_2 = \frac{A_1}{\sqrt{2}} \qquad (11)$$

$$A_4 = \frac{A_1}{2} \qquad (12)$$

$$A_8 = \frac{A_1}{2\sqrt{2}} \qquad (13)$$

where $A_2$ is the signal amplitude for the first sub-rate (wherein each symbol occurs 2 times), $A_4$ is the signal amplitude for the second sub-rate (wherein each symbol occurs 4 times), and $A_8$ is the signal amplitude for the third sub-rate (wherein each symbol occurs 8 times).

A symbol represents either a (+1) value or a (−1) value. Thus, for each 8-symbol period for the third sub-rate (wherein each symbol occurs 8 times), there are only two different possible sets of signals:

$$S_{8,1} = \{+A_8, +A_8, +A_8, +A_8, +A_8, +A_8, +A_8, +A_8\}$$

and $$S_{8,2} = \{-A_8, -A_8, -A_8, -A_8, -A_8, -A_8, -A_8, -A_8\}$$

wherein $+A_8$ represents a (+1) value and $-A_8$ represents a (−1) value.

Similarly, for the second sub-rate (wherein each symbol occurs 4 times), there are four different possible sets of signals in each 8-symbol period:

$$S_{4,1} = \{+A_4, +A_4, +A_4, +A_4, +A_4, +A_4, +A_4, +A_4\}$$

$$S_{4,2} = \{+A_4, +A_4, +A_4, +A_4, -A_4, -A_4, -A_4, -A_4\}$$

$$S_{4,3} = \{-A_4, -A_4, -A_4, -A_4, +A_4, +A_4, +A_4, +A_4\}$$

and $$S_{4,4} = \{-A_4, -A_4, -A_4, -A_4, -A_4, -A_4, -A_4, -A_4\}$$

By extension, it can be seen that there are sixteen different possible sets of signals in each 8-symbol period for the first sub-rate (wherein each symbol occurs 2 times):

$$S_{2,1} = \{+A_2, +A_2, +A_2, +A_2, +A_2, +A_2, +A_2, +A_2\}$$

$$S_{2,2} = \{+A_2, +A_2, +A_2, +A_2, +A_2, +A_2, -A_2, -A_2\}$$

$$\ldots$$

$$S_{2,15} = \{-A_2, -A_2, -A_2, -A_2, -A_2, -A_2, +A_2, +A_2\}$$

$$S_{2,16} = \{-A_2, -A_2, -A_2, -A_2, -A_2, -A_2, -A_2, -A_2\}$$

and that there are 256 different possible sets of signals in each 8-symbol period for the full data rate (wherein each symbol occurs once):

$$S_{1,1} = \{+A_1, +A_1, +A_1, +A_1, +A_1, +A_1, +A_1, +A_1\}$$

$$S_{1,2} = \{+A_1, +A_1, +A_1, +A_1, +A_1, +A_1, +A_1, -A_1\}$$

$$\ldots$$

$$S_{1,255} = \{-A_1, -A_1, -A_1, -A_1, -A_1, -A_1, -A_1, +A_1\}$$

$$S_{1,256} = \{-A_1, -A_1, -A_1, -A_1, -A_1, -A_1, -A_1, -A_1\}$$

In general, each ensemble $S_k$ of data sets can be represented by Equation (14) as follows:

$$S_k = \{S_{k,1}, S_{k,2}, \ldots, S_{k,2^{8/k}}\} \quad (14)$$

wherein k=1,2,4,8 for the full data rate and first, second, and third sub-rates, respectively.

An hypothesis $H_k$ that the corresponding data rate was used to generate the IS-95 signal is associated with each ensemble $S_k$. According to maximum likelihood detection theory, the log likelihood function $L(H_k)$ of hypothesis $H_k$ is given by Equation (15) as follows:

$$L(H_k) = \ln P_\Box y | H_k, \rho_\Box \quad (15)$$

where $P_\Box y | H_k, \rho_\Box$ is the conditional probability of the occurrence of y (i.e., a particular recovered code symbol as in Equation (10)) for a given hypothesis $H_k$ and a given envelope $\rho$.

According to the present invention, all four hypotheses $H_k$ are tested (i.e., k=1,2,4,8 for the four different data rates) and the hypothesis with the greatest log likelihood function $L(H_k)$ is determined to be the actual selected data rate. Assuming equal probabilities within each symbol ensemble, the four conditional probabilities $P_\Box y | H_{k\Box}$ can be expanded according to Equations (16)–(19) as follows:

$$P_\Box y | H_{8\Box} = \tfrac{1}{2}_\Box P_\Box y | S_{8,1\Box} + P_\Box y | S_{8,2\Box\Box} \quad (16)$$

$$P_\Box y | H_{4\Box} = \tfrac{1}{4}_\Box P_\Box y | S_{4,1\Box} + P_\Box y | S_{4,2\Box} + P_\Box y | S_{4,3\Box} + P_\Box y | S_{4,4\Box\Box} \quad (17)$$

$$P_\Box y | H_{2\Box} = \tfrac{1}{16}_\Box P_\Box y | S_{2,1\Box} + P_\Box y | S_{2,2\Box} + \ldots + P_\Box y | S_{2,15\Box} + P_\Box y | S_{2,16\Box\Box} \quad (18)$$

$$P_\Box y | H_{1\Box} = \tfrac{1}{256}_\Box P_\Box y | S_{1,1\Box} + P_\Box y | S_{1,2\Box} + \ldots + P_\Box y | S_{1,255\Box} + P_\Box y | S_{1,256\Box\Box} \quad (19)$$

wherein $P_\Box y | S_{k,i\Box}$ is the conditional probability of y given a particular 8-symbol set $S_{k,i}$.

For the lowest data rate (i.e., the third sub-rate, k=8), substituting Equations (10) and (16) into Equation (15), the log likelihood function $L(H_8)$ for each 8-symbol period $\underline{y}$ can be represented according to Equation (20) as follows:

$$L(H_8) = \ln P_\Box \underline{y} | H_8, \rho_\Box = \quad (20)$$

$$\ln \left[ \frac{1}{2} \prod_{j=1}^{8} \frac{1}{\sqrt{2\pi\sigma^2 \rho_j^2}} \left\{ e^{-\frac{1}{2}\sum_{l=1}^{8} \frac{(y_l - \rho_l^2 A_8)^2}{2\rho_l^2 \sigma^2}} + e^{-\frac{1}{2}\sum_{l=1}^{8} \frac{(y_l + \rho_l^2 A_8)^2}{2\rho_l^2 \sigma^2}} \right\} \right]$$

where $\pm A_8$ is substituted for $\tilde{x}_i$ in Equation (10), $y_i$ is the $l^{th}$ sample in the 8-sample period $\underline{y}$, $\rho_l$ is envelope for the $l^{th}$ sample, and the noise term from Equation (10) is reflected in $\sigma^2$.

Equation (20) can be rewritten as Equation (21) as follows:

$$L(H_8) = \quad (21)$$

$$\frac{1}{2} \sum_{l=1}^{8} \ln\left(\frac{1}{2\pi\sigma^2 \rho_l^2}\right) - \frac{1}{2\sigma^2} \sum_{l=1}^{8} \left(\frac{y_l^2 + \rho_l^4 A_8^2}{\rho_l^2}\right) + \ln\cosh\left(\frac{A_8}{\sigma^2} \sum_{l=1}^{8} y_l\right)$$

By similar derivations, the log likelihood function $L(H_4)$ for each 8-symbol period y for the second sub-rate (k=4) can be represented according to Equation (22) as follows:

$$L(H_4) = \frac{1}{2} \sum_{l=1}^{8} \ln\left(\frac{1}{2\pi\sigma^2 \rho_l^2}\right) - \frac{1}{2\sigma^2} \sum_{l=1}^{8} \left(\frac{y_l^2 + \rho_l^4 A_4^2}{\rho_l^2}\right) + \quad (22)$$

$$\ln\cosh\left(\frac{A_4}{\sigma^2} \sum_{l=1}^{4} y_l\right) + \ln\cosh\left(\frac{A_4}{\sigma^2} \sum_{l=5}^{8} y_l\right)$$

The log likelihood function $L(H_2)$ for each 8-symbol period $\underline{y}$ for the first sub-rate (k=2) can be represented according to Equation (23) as follows:

$$L(H_2) = \frac{1}{2} \sum_{l=1}^{8} \ln\left(\frac{1}{2\pi\sigma^2 \rho_l^2}\right) - \quad (23)$$

-continued $$\frac{1}{2\sigma^2}\sum_{l=1}^{8}\left(\frac{y_l^2+\rho_l^4 A_2^2}{\rho_l^2}\right)+\ln\cosh\left(\frac{A_2}{\sigma^2}\sum_{l=1}^{2}y_l\right)+$$

$$\ln\cosh\left(\frac{A_2}{\sigma^2}\sum_{l=3}^{4}y_l\right)+\ln\cosh\left(\frac{A_2}{\sigma^2}\sum_{l=5}^{6}y_l\right)+\ln\cosh\left(\frac{A_2}{\sigma^2}\sum_{l=7}^{8}y_l\right)$$

The log likelihood function $L(H_1)$ for each 8-symbol period $\underline{y}$ for the full data rate (k=1) can be represented according to Equation (24) as follows:

$$L(H_1) = \quad (24)$$

$$\frac{1}{2}\sum_{l=1}^{8}\ln\left(\frac{1}{2\pi\sigma^2\rho_l^2}\right)-\frac{1}{2\sigma^2}\sum_{l=1}^{8}\left(\frac{y_l^2+\rho_l^4 A_1^2}{\rho_l^2}\right)+\ln\cosh\left(\frac{A_1}{\sigma^2}y_1\right)+$$

$$\ln\cosh\left(\frac{A_1}{\sigma^2}y_2\right)+\ldots+\ln\cosh\left(\frac{A_1}{\sigma^2}y_7\right)+\ln\cosh\left(\frac{A_1}{\sigma^2}y_8\right)$$

Equations (21)–(24) can be further simplified. Since, for the present invention, what is important is the relative magnitudes of the log likelihood functions, the common terms in the linear portions of each equation can be dropped. In addition, the relationships of Equations (11)–(13) can be used to express Equations (21)–(24) in terms of the full data rate amplitude $A_1$. These simplifications yields Equations (25)–(28) as follows:

$$L(H_8) = \frac{-A_1^2}{16\sigma^2}\sum_{l=1}^{8}\rho_l^2+\ln\cosh\left(\frac{A_1}{2\sqrt{2}\,\sigma^2}\sum_{l=1}^{8}y_l\right) \quad (25)$$

$$L(H_4) = \frac{-A_1^2}{8\sigma^2}\sum_{l=1}^{8}\rho_l^2+\ln\cosh\left(\frac{A_1}{2\sigma^2}\sum_{l=1}^{4}y_l\right)+\ln\cosh\left(\frac{A_1}{2\sigma^2}\sum_{l=5}^{8}y_l\right) \quad (26)$$

$$L(H_2) = \quad (27)$$

$$\frac{-A_1^2}{4\sigma^2}\sum_{l=1}^{8}\rho_l^2+\ln\cosh\left(\frac{A_1}{\sqrt{2}\,\sigma^2}\sum_{l=1}^{2}y_l\right)+\ln\cosh\left(\frac{A_1}{\sqrt{2}\,\sigma^2}\sum_{l=3}^{4}y_l\right)+$$

$$\ln\cosh\left(\frac{A_1}{\sqrt{2}\,\sigma^2}\sum_{l=5}^{6}y_l\right)+\ln\cosh\left(\frac{A_1}{\sqrt{2}\,\sigma^2}\sum_{l=7}^{8}y_l\right)$$

$$L(H_1) = \frac{-A_1^2}{2\sigma^2}\sum_{l=1}^{8}\rho_l^2+\sum_{l=1}^{8}\ln\cosh\left(\frac{A_1}{\sigma^2}y_l\right) \quad (28)$$

Equations (25)–(28) can be simplified even further using the approximation of Equation (29) as follows:

$$\ln\cosh(x)\approx\text{for }|x|\text{ for }x\geq 6\text{ or }7 \quad (29)$$

Using the approximation of Equation (29), Equations (25)–(28) can be rewritten as Equations (30)–(33) as follows:

$$L(H_8) = \frac{-A_1^2}{16\sigma^2}\sum_{l=1}^{8}\rho_l^2+\left|\frac{A_1}{2\sqrt{2}\,\sigma^2}\sum_{l=1}^{8}y_l\right| \quad (30)$$

$$L(H_4) = \frac{-A_1^2}{8\sigma^2}\sum_{l=1}^{8}\rho_l^2+\left|\frac{A_1}{2\sigma^2}\sum_{l=1}^{4}y_l\right|+\left|\frac{A_1}{2\sigma^2}\sum_{l=5}^{8}y_l\right| \quad (31)$$

$$L(H_2) = \frac{-A_1^2}{4\sigma^2}\sum_{l=1}^{8}\rho_l^2+\left|\frac{A_1}{\sqrt{2}\,\sigma^2}\sum_{l=1}^{2}y_l\right|+ \quad (32)$$

$$\left|\frac{A_1}{\sqrt{2}\,\sigma^2}\sum_{l=3}^{4}y_l\right|+\left|\frac{A_1}{\sqrt{2}\,\sigma^2}\sum_{l=5}^{6}y_l\right|+\left|\frac{A_1}{\sqrt{2}\,\sigma^2}\sum_{l=7}^{8}y_l\right|$$

$$L(H_1) = \frac{-A_1^2}{2\sigma^2}\sum_{l=1}^{8}\rho_l^2+\sum_{l=1}^{8}\left|\frac{A_1}{\sigma^2}y_l\right| \quad (33)$$

Again, since all that matters for the present invention are the relative magnitudes of the log likelihood, Equations (30)–(33) can be multiplied by $\sigma^2$. The pilot signal can be used to obtain the channel state $\rho_l^2$ and the values $y_l$ are the actual partially decoded symbols. As such, for a known full-rate signal amplitude A, values corresponding to the log likelihood functions $L(H_k)$ for the four different data rates can be calculated for each 8-symbol period. In one possible implementation, log likelihood data is accumulated over a number of 8-symbol periods (e.g., there are 48 8-symbol periods in a 20-ms frame) and the data-rate determination made during rate detection 214 of FIG. 2 can be based on that accumulated data, with the largest accumulated log likelihood value corresponding to the selected data rate.

To test the algorithm, a model of the received signal may be created over a Gaussian channel as well as a fading channel. Random patterns can then be transmitted using a particular repetition rate and the receiver has to determine which repetition rate was applied. The same test of a fading channel can also be undertaken to demonstrate the ability of the algorithm to identify the transmitter rate when the transmitted signal has a known power.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for processing a received signal, wherein the received signal has been generated based on an unknown data rate of two or more possible data rates, comprising the steps of:

(a) partially decoding the received signal to generate partially decoded data;

(b) for each possible data rate, generating a statistical value from the partially decoded data;

(c) determining the unknown data rate by comparing the statistical values for the possible data rates; and (d) further decoding the partially decoded data using the determined unknown data rate.

2. The invention of claim 1, wherein, for each possible data rate, the statistical value corresponds to a log likelihood function based on the partially decoded data.

3. The invention of claim 1, wherein the received signal is an IS-95 signal generated based on one of four possible data rates for either Rate Set 1 or Rate Set 2.

4. The invention of claim 1, wherein: the partial decoding comprises one or more of power bit erasure, block de-interleaving, and depuncture; and the further decoding comprises one or more of symbol de-repetition and convolutional decoding.

5. The invention of claim 1, wherein, for each possible data rate, the statistical value is generated as a function of the partially decoded data, a signal amplitude, and a received signal envelope.

6. The invention of claim 5, wherein the signal amplitude is estimated from channel state information corresponding to the received signal.

7. The invention of claim 1, wherein, for each possible data rate, the statistical value is accumulated over a plurality of sets of data, wherein each set of data corresponds to a maximum repetition rate for the possible data rates.

8. The invention of claim 1, wherein:
the received signal is an IS-95 signal generated based on one of four possible data rates for either Rate Set 1 or Rate Set 2;
the partial decoding comprises power bit erasure and block de-interleaving;
for Rate Set 2, the partial decoding further comprises depuncture;
the further decoding comprises symbol de-repetition and convolutional decoding;
for each data rate, the statistical value is generated as a log likelihood function based on the partially decoded data, a signal amplitude, and a received signal envelope, wherein the statistical value is accumulated over a plurality of sets of data, wherein each set of data comprises eight samples of the partially decoded data; and
the signal amplitude is estimated from channel state information corresponding to the received signal.

9. An apparatus for processing a received signal, wherein the received signal has been generated based on an unknown data rate of two or more possible data rates, comprising:
(a) means for partially decoding the received signal to generate partially decoded data;
(b) means for generating a statistical value from the partially decoded data for each possible data rate;
(c) means for determining the unknown data rate by comparing the statistical values for the possible data rates; and
(d) means for further decoding the partially decoded data using the determined unknown data rate.

10. The invention of claim 9, wherein, for each possible data rate, the statistical value corresponds to a log likelihood function based on the partially decoded data.

11. The invention of claim 9, wherein the received signal is an IS-95 signal generated based on one of four possible data rates for either Rate Set 1 or Rate Set 2.

12. The invention of claim 9, wherein:
the partial decoding comprises one or more of power bit erasure, block de-interleaving, and depuncture; and
the further decoding comprises one or more of symbol de-repetition and convolutional decoding.

13. The invention of claim 9, wherein, for each possible data rate, the statistical value is generated as a function of the partially decoded data, a signal amplitude, and a received signal envelope.

14. The invention of claim 13, wherein the signal amplitude is estimated from channel state information corresponding to the received signal.

15. The invention of claim 9, wherein, for each possible data rate, the statistical value is accumulated over a plurality of sets of data, wherein each set of data corresponds to a maximum repetition rate for the possible data rates.

16. The invention of claim 9, wherein:
the received signal is an IS-95 signal generated based on one of four possible data rates for either Rate Set 1 or Rate Set 2;
the partial decoding comprises power bit erasure and block de-interleaving;
for Rate Set 2, the partial decoding further comprises depuncture;
the further decoding comprises symbol de-repetition and convolutional decoding;
for each data rate, the statistical value is generated as a log likelihood function based on the partially decoded data, a signal amplitude, and a received signal envelope, wherein the statistical value is accumulated over a plurality of sets of data, wherein each set of data comprises eight samples of the partially decoded data; and
the signal amplitude is estimated from channel state information corresponding to the received signal.

17. A receiver adapted to process a received signal, wherein the received signal has been generated based on an unknown data rate of two or more possible data rates, comprising:
(a) a first decoder adapted to partially decode the received signal to generate partially decoded data;
(b) a rate detector adapted to generate a statistical value from the partially decoded data for each possible data rate and determine the unknown data rate by comparing the statistical values for the possible data rates; and
(c) a second decoder adapted to further decode the partially decoded data using the determined unknown data rate.

18. The invention of claim 17, wherein, for each possible data rate, the statistical value corresponds to a log likelihood function based on the partially decoded data.

19. The invention of claim 17, wherein the received signal is an IS-95 signal generated based on one of four possible data rates for either Rate Set 1 or Rate Set 2.

20. The invention of claim 17, wherein:
the first decoder comprises one or more of a power bit eraser, a block de-interleaver, and a depuncturer; and
the second decoder comprises one or more of a symbol de-repeater and a convolutional decoder.

21. The invention of claim 17, wherein, for each possible data rate, the statistical value is generated as a function of the partially decoded data, a signal amplitude, and a received signal envelope.

22. The invention of claim 21, wherein the signal amplitude is estimated from channel state information corresponding to the received signal.

23. The invention of claim 17, wherein, for each possible data rate, the statistical value is accumulated over a plurality of sets of data, wherein each set of data corresponds to a maximum repetition rate for the possible data rates.

24. The invention of claim 17, wherein:
the received signal is an IS-95 signal generated based on one of four possible data rates for either Rate Set I or Rate Set 2;
the first decoder comprises a power bit eraser and a block de-interleaver;
for Rate Set 2, the first decoder further comprises a depuncturer;
the second decoder comprises a symbol de-repeater and a convolutional decoder;
for each data rate, the statistical value is generated as a log likelihood function based on the partially decoded data, a signal amplitude, and a received signal envelope, wherein the statistical value is accumulated over a plurality of sets of data, wherein each set of data comprises eight samples of the partially decoded data; and
the signal amplitude is estimated from channel state information corresponding to the received signal.

* * * * *